United States Patent [19]

Aliouate

[11] Patent Number: 4,588,058
[45] Date of Patent: May 13, 1986

[54] DEVICE FOR DAMPING THE VIBRATIONS OF A FLEXIBLE CLUTCH IN WET CONDITIONS, NOTABLY FOR TORQUE CONVERTER

[75] Inventor: Ali Aliouate, Vincennes, France

[73] Assignee: Regie Nationale des Usines Renault, Boulogne-Billancourt, France

[21] Appl. No.: 529,782

[22] Filed: Sep. 6, 1983

[30] Foreign Application Priority Data

Sep. 7, 1982 [FR] France .................... 82 15192

[51] Int. Cl.⁴ .................................... F16D 47/02
[52] U.S. Cl. .................... 192/106.2; 192/70.17; 464/68
[58] Field of Search .............. 192/3.28, 70.17, 106.1, 192/106.2; 464/68

[56] References Cited

U.S. PATENT DOCUMENTS

| 3,982,617 | 9/1976 | Worner | 192/106.2 |
|---|---|---|---|
| 4,289,220 | 9/1981 | Onuma et al. | 192/3.3 |
| 4,304,107 | 12/1981 | Fall et al. | 192/106.2 |
| 4,347,717 | 9/1982 | Lamarche | 192/106.1 |
| 4,470,494 | 9/1984 | Takeuchi | 192/70.17 |
| 4,484,898 | 11/1984 | Kohno | 192/106.2 |

FOREIGN PATENT DOCUMENTS

| 2183390 | 12/1973 | France . |
|---|---|---|
| 2218503 | 9/1974 | France . |
| 2282578 | 3/1976 | France . |
| 2393199 | 12/1978 | France . |
| 1482639 | 8/1977 | United Kingdom . |
| 1492982 | 11/1977 | United Kingdom . |

Primary Examiner—Ronald C. Capossela
Attorney, Agent, or Firm—Beveridge, DeGrandi and Weilacher

[57] ABSTRACT

Device for damping the vibrations of a flexible clutch in wet conditions, notably for a torque converter.

Device for damping the vibrations of a flexible clutch characterized in that the friction linings (9, 10) are adhered directly onto an annular zone of the internal coupling member (4), in that one of them (9) bears directly against the inside face (11) of the input member (1), while the other (10) bears on the indexed washer (12), and finally in that the plate (14) used for indexation engagement of the indexed washer (12) and as bearing surface for the flexible washer (15) is fixed to the input member (1) by passing through suitable holes in the internal coupling member (4).

4 Claims, 6 Drawing Figures

DEVICE FOR DAMPING THE VIBRATIONS OF A FLEXIBLE CLUTCH IN WET CONDITIONS, NOTABLY FOR TORQUE CONVERTER

The invention relates to flexible coupling devices like those used in kinetic torque converters, and more particularly those torque converters which are combined with a power shunt type gearbox in which, for some ratios at least, the shunted part of the power passes straight from the drive shaft to the gearbox mechanism without passing through the torque converter, this in order to improve the efficiency.

In order to make the transmission of this shunted portion of the power smoother a method is known of interposing, between the input member of the converter (impeller or pump) directly connected with the engine flywheel and the output member corresponding to direct transmission of the mechanical power, a flexible coupling consisting generally of helical springs placed round the periphery in a tangential direction and iserted between the two members.

However, when operating the gearbox or during sudden accelerations this type of arrangement has the drawback of generating vibrations or oscillations between the two members which adversely affect its operation.

In order to prevent these another known method is to place a rotational damping device between these two members; this damping device consists basically of two annular plates riveted onto one of the members, generally on the rotary casing of the converter, of a disc fixed to the other member and comprising friction linings of both its faces, this disc being placed between the two annular plates, of a smooth washer indexed in rotation with respect to the second plate and bearing against the disc, and finally of a corrugated washer inserted between the second plate and the indexed washer so as to maintain a force axially compressing the whole of the stack. This system is rather bulky and expensive.

The object of the invention is to make an equivalent assembly in a simpler and less bulky way.

In the simplified design according to the invention the disc carrying the friction linings is made in one piece with the internal element of the flexible clutch which is fixed to the converter's direct output member and it bears directly against the inside surface of the input member, i.e. of the outer casing of the converter, which enables the first plate to be eliminated and, furthermore, the indexed washer and its usual flexible washer engages and bears directly on a plate which is fixed to the input member by passing through the said clutch element, with this plate also being capable of being made in one piece with one of the external elements of the clutch.

Other features of the invention will be revealed in the following description of an embodiment taken as an example and shown in the appended drawings in which.

Figure 1:
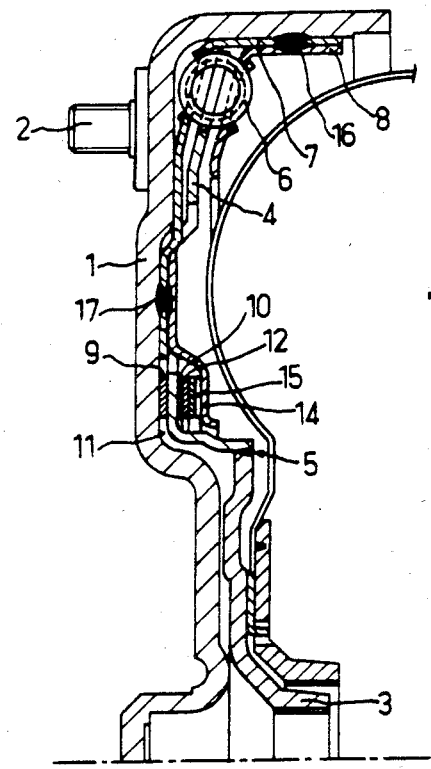
FIG. 1 is a part axial half-section of a first embodiment.

The figures show the input member 1 of the converter which consists of the rotary outer casing forming the cover of the centrifugal pump and fixed by fastenings 2 to the engine flywheel. The converter's direct output member can be seen at 3; this enables the power to be transmitted to the gearbox, which is not shown, without passing through the converter. At 4 can be seen the internal element of the elastic coupling which is fixed to the output member 3 at 5 and which comprises notches on its periphery to house the compression springs 6; these springs are also held captive in windows formed respectively in the external elements 7 and 8 which are fixed to the input member 1.

Figure 2:
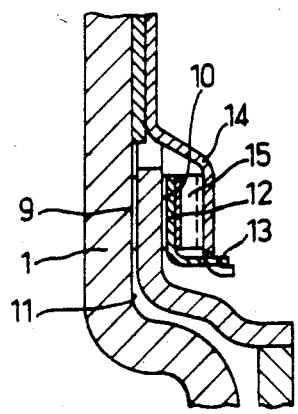
FIG. 2 is a part view on a larger scale of the middle part of FIG. 1.

The damping device according to the invention is made by adhering the usual friction linings 9 and 10 (FIG. 2) directly on the two faces of an annular zone of element 4, which thus acts as the usual friction disc in addition to having its flexible coupling function.

The lining 9 rubs directly on the inner face 11 of the casing 1; this casing therefore also acts as the usual first plate.

The other lining 10 rubs against the usual indexed washer 12, the locking teeth 13 of which engage in a washer support plate 14 in a conventional manner to prevent rotation of the washer 12. The plate 14 is supported on the input member 1 by extension portions of the plate which extend through cut-outs in member 4 as described below. The usual corrugated flexible washer 15 is inserted between and bears against the indexed washer 12 and the plate 14.

The two parts 7 and 8 of the flexible coupling can be spot-welded directly 16 onto the input member 1 as shown in FIG. 1, whilst the plate 14 can also be spot-welded to this same member 1 at the same time as the part 7. It would naturally be possible to use any other fixing method, e.g. conventional rivets.

As shown in FIG. 1, the coupling is located in the space which lies axially between the flat bottom of the torque converter housing and the half toroidal shell of the torque converter turbine. The housings for springs 6 are in the peripheral portion of this space, the washer support plate 14 is in a central portion of this space, and the holes 19 and 20 in the internal part 4 are in an intermediate space which is radially between the peripheral and central portions.

Figure 3:
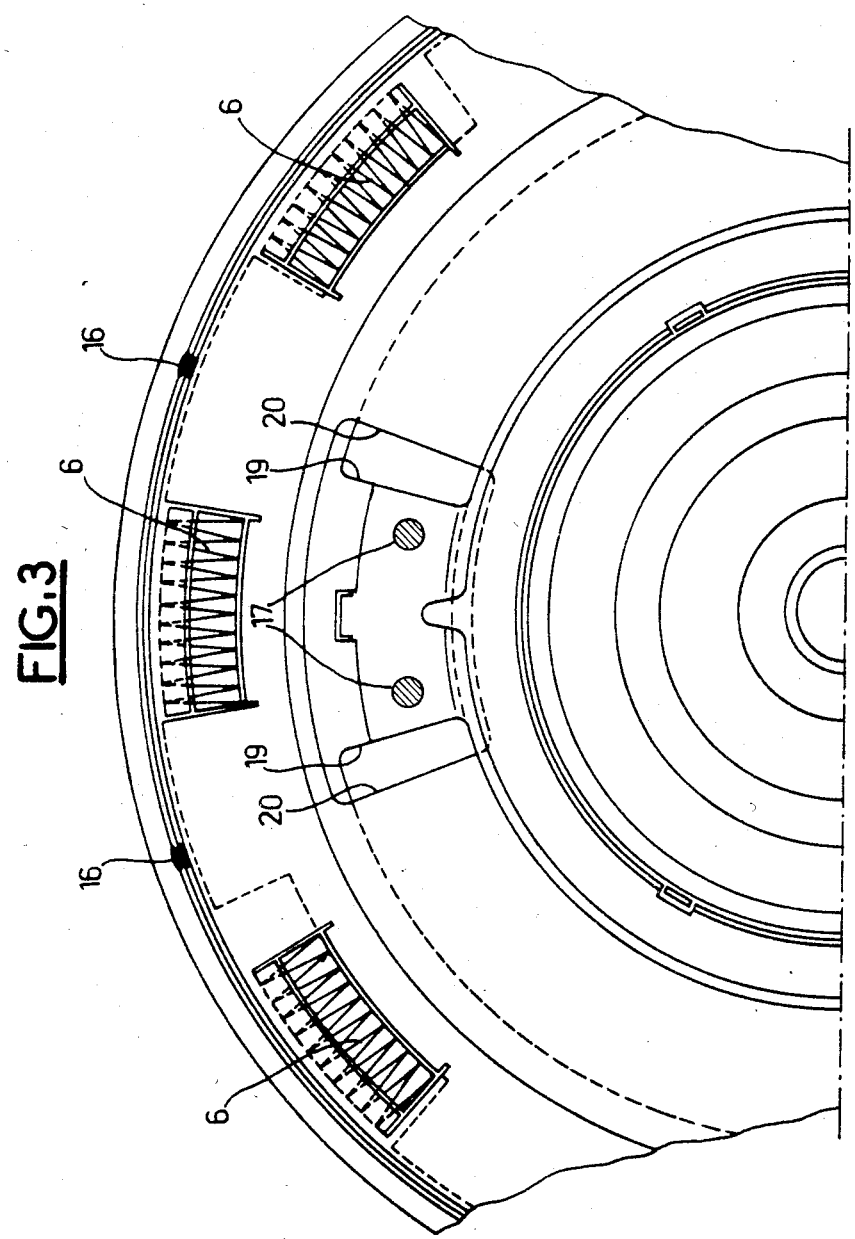
FIG. 3 is a front view of FIG. 1.

In FIG. 3 can be seen the detail of the cut-outs 19 and 20 by means of which the plate 14 can be fixed as indicated by passing through member 4. In addition these cut-outs 19 and 20 are so dimensioned as to act as angular stops between the two members 4 and 7-8 at the same time.

Figure 4:
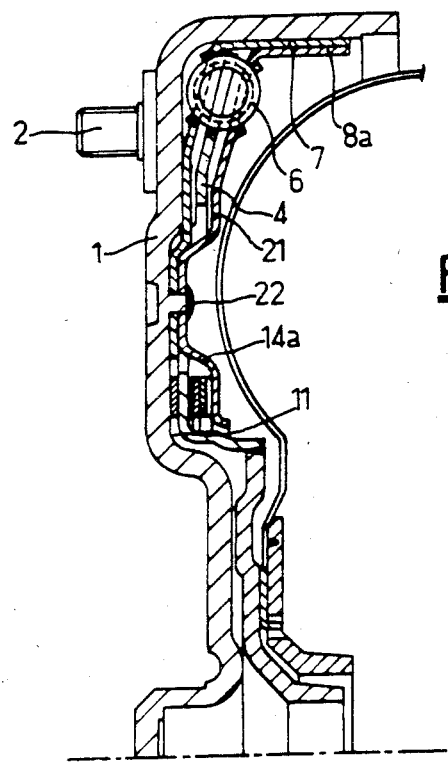
FIG. 4 is a part half-section of another embodiment.
Figure 5:
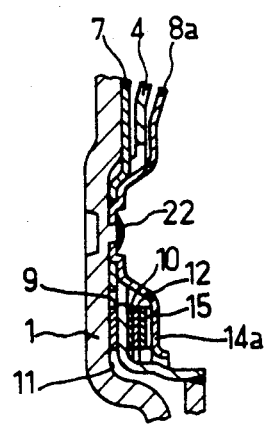
FIG. 5 shows the detail of a middle part of FIG. 4.

In a variant it is also possible, as shown in FIGS. 4 and 5, to do away with the plate 14 by making it in one piece with part 8; the new part thus obtained is marked with the reference number 21 and comprises an external portion 8a and an internal portion 14a acting respectively as parts 8 and 14 before. With this last variant it can be seen that a single row of fastenings 22 is enough to fix both parts 7 and 21 to member 1, instead of the previous two rows of spot welds 16 and 17. These fastenings 22 may also consist of spot welds or rivets or again, as shown in FIGS. 4 and 5, of nipples formed in place within the thickness of member 1 and riveted inside the device.

On the basis of this other embodiment variant it is possible to further simplify the device by also eliminating part 7, which only serves to restrain the springs 6 laterally and to form their symmetrical axial stops in conjunction with part 8a. The first function may be carried out directly by the inside face 11 of the casing 1. The second function can be avoided by using slightly asymmetrical stops for the ends of the springs 6. For that purpose the facing surfaces of the two remaining members 4 and 8a of the flexible coupling are placed in close proximity to each other on either side of the midplane of each spring 6, as shown in FIG. 6.

In this case it is generally necessary to make part 8a thicker than original parts 7 and 8 so as to provide the same strength. It is then possible either to provide portion 14a with a corresponding thickness in order to make a single piece, similar to 21, combining external 8a and internal 14a portions, or again to make separate parts, i.e. a thick external part 8a and a thinner internal part 14a, as shown in FIG. 6. In both cases the previous advantage of only requiring a single fastening line 22 is retained although the parts are fewer and simpler.

Figure 6:
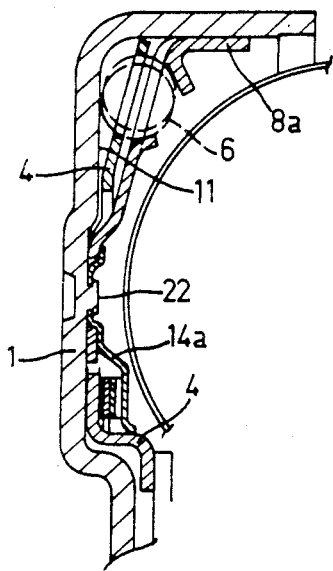
FIG. 6 is a part half-section of another further embodiment.

As can be seen in FIG. 6, the housing for each spring 6 is formed so that the spring has one generatrix bearing against the torque converter housing 1 which acts as one of the external members of the coupling, and two generatricies bearing against edges in the window formed in the member 8a.

It can thus be seen that the invention, particularly in its last forms, enables the number of parts and the number of assembly operations required to be substantially reduced. It is also clear that the bulk is considerably reduced compared with the conventional design.

I claim:

1. In a flexible coupling integrated in an hydrokinetic torque converter for outputting to a gear box with power derivation the derivated portion of the power through an auxiliary output shaft without transiting through said torque converter, said torque converter comprising a rotatable housing with a substantially flat bottom, said housing containing a half toroidal turbine shell, said coupling comprising a pair of external parts which are driven by said housing and are formed to provide spring housings therebetween, helical compression springs held captive in said spring housings, an internal part which is located between the external parts and is connected to said auxiliary output shaft; and, a damping device for dampening oscillating movement between said housing and said auxiliary output shaft; said damping device including an indexed washer, a corrugated flexible washer and friction linings mounted on annular friction zones on opposite faces of said internal part, one of said friction linings being engageable by one of said washers, the improvements wherein said spring housings of said coupling are located in a peripheral space located between said flat bottom of said housing and said half toroidal shell, said damping device of said coupling is located in a central space located between said flat bottom of said housing and said half toroidal shell, said internal part has holes formed at locations which lie in a narrow intermediate space located axially between said flat bottom of said housing and said half toroidal shell and radially between said peripheral and central spaces, and a washer support plate in said central space, said washer support plate having:
 (a) a bearing part which bears against said corrugated flexible washer,
 (b) means engaged with said indexed washer to prevent rotation thereof, and
 (c) portions which extend through said holes and are connected to said flat bottom of said housing in said intermediate space.

2. A flexible coupling according to claim 1 wherein one of the external parts has portions which pass through said holes in the internal part and are connected directly to said flat bottom of said housing.

3. A flexible coupling according to claim 2 wherein a single piece of material includes the washer support plate and one of the external parts of the coupling.

4. A flexible coupling according to claim 2 wherein one of said external parts is said flat bottom of said housing, the other said external part and the internal part being located in close proximity to and on opposite sides of middle planes of said helical compression springs and being operable to provide end stops for the springs, said other external part having, for each of said springs, a window with two edges which bear against two generatricies of the spring, each said spring having a third generatrix bearing against said flat bottom of said housing.

* * * * *